US011870828B2

(12) United States Patent
Hsu et al.

(10) Patent No.: US 11,870,828 B2
(45) Date of Patent: Jan. 9, 2024

(54) SYSTEM, METHOD AND COMPUTER-READABLE MEDIUM FOR RENDERING A STREAMING

(71) Applicant: 17LIVE Japan Inc., Tokyo (JP)

(72) Inventors: Yung-Chi Hsu, Taipei (TW);
Chung-Chiang Hsu, Taipei (TW);
Shao-Yuan Wu, Taipei (TW);
Ming-Che Cheng, Taipei (TW)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 17/880,707

(22) Filed: Aug. 4, 2022

(65) Prior Publication Data
US 2023/0106214 A1 Apr. 6, 2023

Related U.S. Application Data

(63) Continuation-in-part of application No. PCT/US2021/052775, filed on Sep. 30, 2021, and a
(Continued)

(51) Int. Cl.
*G06F 13/00* (2006.01)
*H04L 65/61* (2022.01)
(Continued)

(52) U.S. Cl.
CPC ............ *H04L 65/61* (2022.05); *H04L 65/764* (2022.05); *H04L 65/80* (2013.01)

(58) Field of Classification Search
CPC ........ H04L 65/61; H04L 65/764; H04L 65/80
(Continued)

(56) References Cited

U.S. PATENT DOCUMENTS 6,772,203 B1 * 8/2004 Feiertag ................ G06F 16/957
709/219
8,510,763 B2 * 8/2013 Fatehpuria ................ G06F 9/50
719/329
(Continued)

FOREIGN PATENT DOCUMENTS

CN 103916474 A 7/2014
CN 107864402 A 3/2018
(Continued)

OTHER PUBLICATIONS

International Search Report dated Dec. 29, 2021, issued in corresponding International Application No. PCT/US2021/052775 (7 pgs.).
(Continued)

*Primary Examiner* — Kenneth R Coulter
(74) *Attorney, Agent, or Firm* — Pillsbury Winthrop Shaw Pittman, LLP

(57) ABSTRACT

The present disclosure relates to a system, a method and a computer-readable medium for rendering a streaming on a user terminal. The method includes rendering the streaming in a first mode, receiving an environment parameter of the user terminal, receiving a timing when the user terminal closes the streaming, determining a threshold value of the environment parameter based on the timing the user terminal closes the streaming, receiving an updated environment parameter of the user terminal, and rendering the streaming in a second mode if the updated environment parameter meets the threshold value. The second mode includes fewer data objects than the first mode or includes a downgraded version of a data object in the first mode for the rendering. The present disclosure can customize the rendering mode for each user and maximize the satisfaction of viewing streaming for each user.

21 Claims, 7 Drawing Sheets

Related U.S. Application Data continuation-in-part of application No. PCT/US2021/052777, filed on Sep. 30, 2021.

(51) Int. Cl.
*H04L 65/75* (2022.01)
*H04L 65/80* (2022.01)

(58) Field of Classification Search
USPC ............................. 709/231, 233, 234, 235
See application file for complete search history.

(56) References Cited

U.S. PATENT DOCUMENTS

| | | | |
|---|---|---|---|
| 11,595,456 B2 * | 2/2023 | Howard | ........... H04N 21/44004 |
| 2004/0128346 A1 | 7/2004 | Melamed et al. | |
| 2011/0307900 A1 | 12/2011 | Fatehpuria et al. | |
| 2013/0073809 A1 | 3/2013 | Antani et al. | |
| 2016/0065689 A1 | 3/2016 | Imai | |
| 2016/0112500 A1 | 4/2016 | Kim et al. | |
| 2017/0060538 A1 | 3/2017 | Barsness et al. | |
| 2019/0146920 A1 | 5/2019 | Hua et al. | |
| 2019/0281129 A1 | 9/2019 | Menai et al. | |
| 2019/0373036 A1 | 12/2019 | Howard et al. | |

FOREIGN PATENT DOCUMENTS

| | | |
|---|---|---|
| CN | 109788303 A | 5/2019 |
| CN | 112134806 A | 12/2020 |
| CN | 113111076 A | 7/2021 |

OTHER PUBLICATIONS

International Search Report dated Dec. 29, 2021, issued in corresponding International Application No. PCT/US2021/052777 (8 pgs.).
Taiwanese Office Action dated May 17, 2022, issued in corresponding Taiwanese Patent Application No. 11120486070 with English translation (8 pgs.).
Office Action dated Nov. 16, 2022, issued in corresponding Taiwanese Patent Application No. 110136466 with English translation (18 pgs.).
Office Action dated Apr. 27, 2023, issued in corresponding Taiwanese Patent Application No. 110136466 with English translation (22 pgs.).
Notice of Reasons for Refusal dated Oct. 3, 2023, issued in corresponding Japanese Patent Application No. 2022-522346 with English translation (6 pgs.).
Notice of Reasons for Refusal dated Oct. 17, 2023, issued in corresponding Japanese Patent Application No. 2022-516347 with English translation (6 pgs.).

* cited by examiner

SYSTEM, METHOD AND COMPUTER-READABLE MEDIUM FOR RENDERING A STREAMING

CROSS-REFERENCE TO RELATED APPLICATIONS

This application claims priority under 35 U.S.C. § 111(a) and is a continuation-in-part of International Patent Application No. PCT/US2021/052775, filed on 30 Sep. 2021, is a continuation-in-part of International Patent Application No. PCT/US2021/052777, filed on 30 Sep. 2021. The disclosures of each of the previously listed applications are incorporated herein by reference in their entireties.

FIELD

The present disclosure relates to a system, a method and a computer-readable medium for rendering a streaming.

This disclosure also relates to the storage of information on an Internet and, more particularly, to the storage of data objects on a cache of the Internet.

BACKGROUND

Live streaming refers to online streaming media or live video simultaneously recorded and broadcast in real-time. Live streaming encompasses a wide variety of topics, from social media to video games to professional sports.

User interaction via chat rooms forms a major component of live streaming. Conventionally, to boost the motivation of viewers to participate in the live streaming, the application or platform on which the live streaming is viewed provide functions such as gift sending or gaming to improve the interaction between the viewers and the streamers (or broadcasters).

Caches or caching techniques are applied and leveraged throughout technologies including operating systems, networking layers including content delivery networks (CDN), domain name systems (DNS), web applications, and databases. One can use caching to reduce latency and improve input/output operations per second (IOPS) for many read-heavy application workloads, such as Q&A portals, gaming, media sharing, content streaming, and social networking. Cached information can include the results of database queries, computationally intensive calculations, application programming interface (API) requests/responses and web artifacts such as HTML, JavaScript, and image files.

Caching is crucial for CDN services. A CDN moves the content/data object or a copy of the content/data object on a website server or a backend server, such as a backend server of an application, to proxy servers or cache servers, where the content can be quickly accessed by website visitors or users of the application accessing from a nearby location.

Time to live (TTL) is the time that a content/data object (or a copy of the content/data object) is stored in a caching system such as a cache server before it's deleted or refreshed. In the context of CDNs, TTL typically refers to content caching, which is the process of storing a copy of the resources on a website or an application server (e.g., images, prices, text, streaming content) on CDN cache servers to improve page load speed and reduce the bandwidth consumption and workloads on the origin server.

SUMMARY

A method according to one embodiment of the present disclosure is a method for rendering a streaming on a user terminal being executed by one or a plurality of computers, and includes: rendering the streaming in a first mode, receiving an environment parameter of the user terminal, receiving a timing when the user terminal closes the streaming, determining a threshold value of the environment parameter based on the timing the user terminal closes the streaming, receiving an updated environment parameter of the user terminal, and rendering the streaming in a second mode if the updated environment parameter meets the threshold value. The second mode includes fewer data objects than the first mode or includes a downgraded version of a data object in the first mode for the rendering.

A system according to one embodiment of the present disclosure is a system for rendering a streaming on a user terminal that includes one or a plurality of processors, and the one or plurality of computer processors execute a machine-readable instruction to perform: rendering the streaming in a first mode, receiving an environment parameter of the user terminal, receiving a timing when the user terminal closes the streaming, determining a threshold value of the environment parameter based on the timing the user terminal closes the streaming, receiving an updated environment parameter of the user terminal, and rendering the streaming in a second mode if the updated environment parameter meets the threshold value. The second mode includes fewer data objects than the first mode or includes a downgraded version of a data object in the first mode for the rendering.

A computer-readable medium according to one embodiment of the present disclosure is a non-transitory computer-readable medium including a program for rendering a streaming on a user terminal, and the program causes one or a plurality of computers to execute: rendering the streaming in a first mode, receiving an environment parameter of the user terminal, receiving a timing when the user terminal closes the streaming, determining a threshold value of the environment parameter based on the timing the user terminal closes the streaming, receiving an updated environment parameter of the user terminal, and rendering the streaming in a second mode if the updated environment parameter meets the threshold value. The second mode includes fewer data objects than the first mode or includes a downgraded version of a data object in the first mode for the rendering.

A method according to another embodiment of the present disclosure is a method for determining a time to live (TTL) for a data object on a cache server being executed by one or a plurality of computers, and includes: detecting an update frequency of the data object, detecting a number of users accessing the data object, and determining the TTL based on the update frequency and the number of users.

A system according to another embodiment of the present disclosure is a system for determining a TTL for a data object on a cache server that includes one or a plurality of processors, and the one or plurality of computer processors execute a machine-readable instruction to perform: detecting an update frequency of the data object, detecting a number of users accessing the data object, and determining the TTL based on the update frequency and the number of users.

A computer-readable medium according to another embodiment of the present disclosure is a non-transitory computer-readable medium including a program for determining a TTL for a data object on a cache server, and the program causes one or a plurality of computers to execute: detecting an update frequency of the data object, detecting a number of users accessing the data object, and determining the TTL based on the update frequency and the number of users.

DETAILED DESCRIPTION

A streaming watched by a user (such as a viewer) on the display of a user terminal (such as a smartphone) is the result of processing or rendering various data objects. Some of the data objects may exist on the user terminal (ex., may have been downloaded along with the application used to watch the live streaming) and some of the data objects may be received by the user terminal through a network. For example, in a live streaming chat room, the data objects may include a streaming data or a live video/audio data from another user (such as a streamer) and other objects to perform functions such as gaming, special effects, gift or avatars.

For a live streaming provider, which may be the provider of the application through which the live streaming is watched by viewers, it is important to make sure that the viewers enjoy the streaming, or stay in the chat room, as long as possible. And it is important to prevent the viewers from leaving the streaming or the chat room due to environment or device factors such as poor network quality or overloaded/overburdened device, which may cause delay, lag, or freezing and jeopardize the viewing experience.

Therefore, how to guarantee a smooth viewing experience in various environment or device conditions is crucial. The present disclosure provides systems, methods and computer-readable mediums that can dynamically or adaptively adjust the data objects used to render the streaming, according to user behaviors or preferences in various conditions, to optimize the viewing experience.

Figure 1:
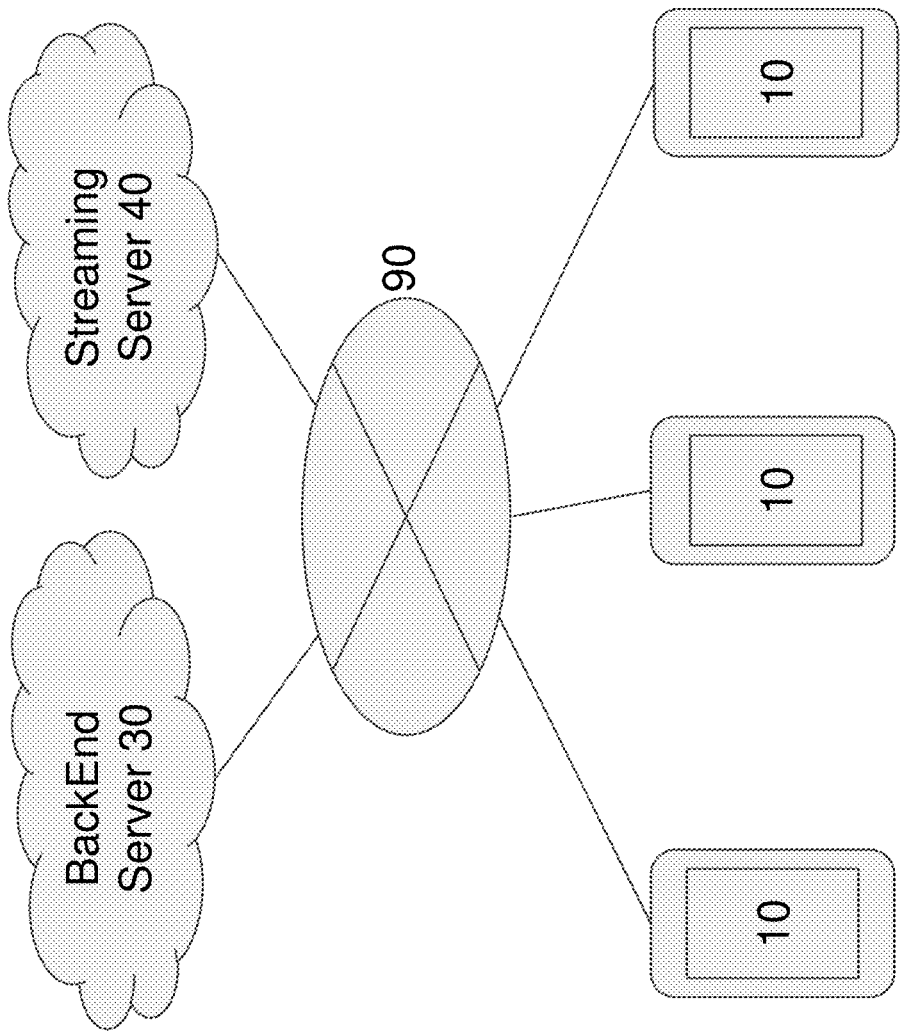
FIG. 1 shows a schematic configuration of a communication system in accordance with some embodiments of the present disclosure.

FIG. 1 shows a schematic configuration of a communication system 1 according to some embodiments of the present disclosure. The communication system 1 provides a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the backend server of an application (APP) provider. The streaming server 40 is a server for handling or providing streaming data or video data. In some embodiments, the streaming server 40 may be a server from a content delivery network (CDN) provider. In some embodiments, the backend server 30 and the streaming server 40 may be independent servers. In some embodiments, the backend server 30 and the streaming server 40 may be integrated into one server. The user terminals 10 are client devices for the live streaming. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 2:
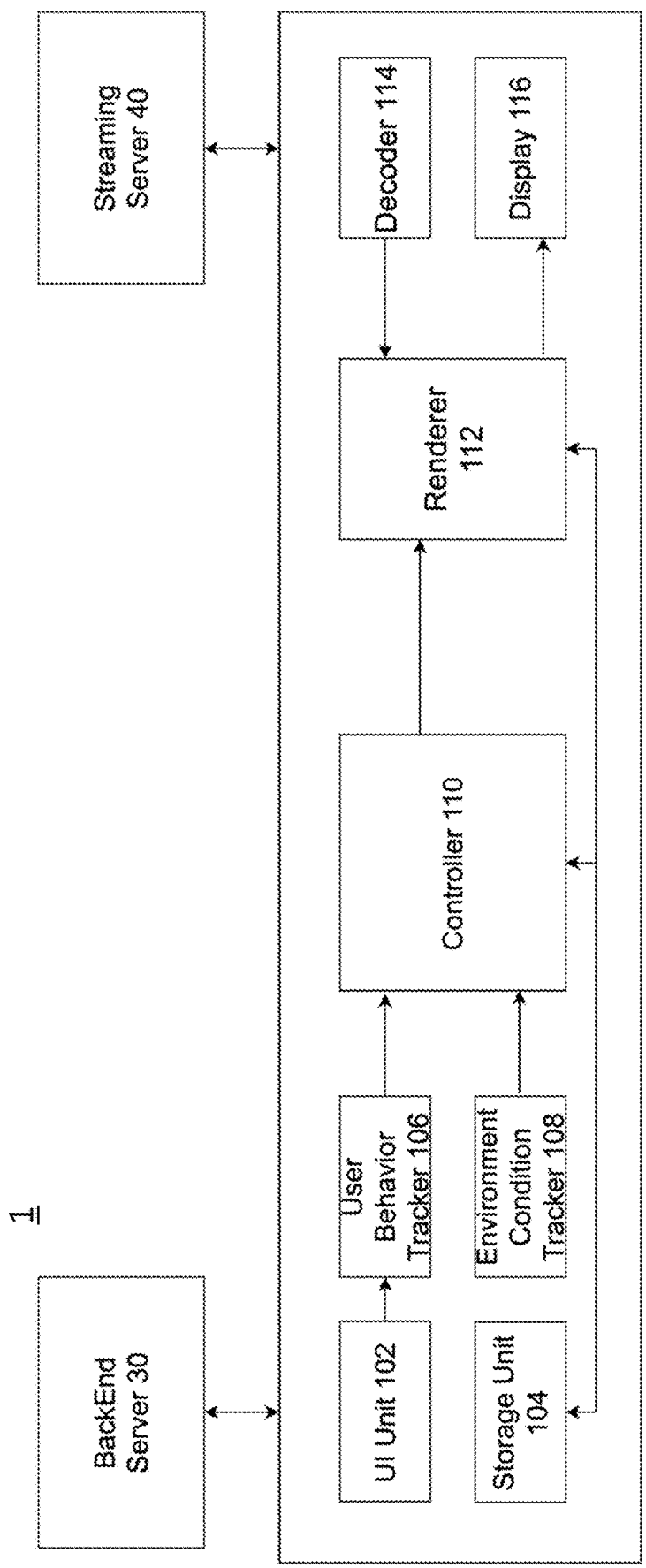
FIG. 2 shows an exemplary functional configuration of a communication system in accordance with some embodiments of the present disclosure.

FIG. 2 shows an exemplary functional configuration of the communication system 1. In this embodiment, the user terminal 10 includes a UI unit 102, a storage unit 104, a user behavior tracker 106, an environment condition tracker 108, a controller 110, a renderer 112, a decoder 114, and a display 116. In some embodiments, each of the above components can be viewed as a processing unit or a processor.

The UI unit 102 is the interface through which a user of the user terminal 10 operates or plays an APP, which may be an APP providing streaming service in some embodiments. The user behavior tracker 106 is configured to monitor or track behaviors or actions of the user terminal 10 and deliver the results to the controller 110. For example, the actions may include participating in/opening a streaming or leaving/closing a streaming on the APP.

The storage unit 104 is configured to store a program of the APP, which includes instructions or data objects necessary for the APP to run on the user terminal 10. The storage unit 104 may be constituted with a DRAM or the like, for example. In some embodiments, The storage unit 104 is constituted with a magnetic disk, a flash memory, or the like, for example. The storage unit 104 stores various kinds of programs including an operating system, various kinds of data, and the like.

The environment condition tracker 108 is configured to monitor or track the environment condition under which the APP is operated, and deliver the results to the controller 110. The environment condition tracker 108 may detect various environment parameters that are related to the operation/playback of the streaming and thus the viewing experience of the user. In some embodiments, the environment parameters may include a CPU usage rate of the user terminal 10, a memory usage rate of the user terminal 10, a time duration or a number of times a freezing/lag happens during the streaming, a length of time during which the number of frames per second (FPS) with which the streaming is being played is below a predetermined value, and network quality parameters that indicate the quality of the network 90. For example, the network quality parameters may include an application programming interface (API) response time, a transmission control protocol (TCP) connection time, a domain name system (DNS) lookup time, an security sockets layer (SSL) handshake time, and a downstream bandwidth regarding the streaming service through the network 90.

The controller 110 receives the user behavior data and the environment parameters from the user behavior tracker 106 and the environment condition tracker 108, and determines how to render or present the subsequent streaming. For example, the controller may determine a rendering mode based on the user behavior data and the environment parameters, access the storage unit 104 and/or the streaming server 40 for the corresponding data objects, and instructs the renderer 112 to render the streaming.

In some embodiments, the controller 110 is configured as a CPU, a GPU, or the like, reads various programs that may be part of an APP and are stored in the storage unit 104 or the like into a main memory (not shown here), and executes various kinds of commands or machine-readable instructions included in the programs.

The decoder 114 is configured to convert streaming data from the streaming server 40 into video data or frame image for the renderer 112 to render the streaming. The streaming data may be provided to the streaming server 40 by another user who could be referred to as a streamer, a broadcaster or an anchor. There may be various versions or grades of the streaming data from one streamer. For example, the streaming server 40 may receive a streaming media from a streamer and convert it into versions with different resolutions such as 360p, 480p and 720p. Different versions or grades of streaming data may be stored in the streaming server 40 with different uniform resource locators (URL). In some embodiments, those URLs are assigned by the backend server 30 and transferred to the user terminal 10 by the backend server 30. The decoder 114 may reach to a URL for a certain grade of streaming data according to the rendering mode determined by the controller 110.

The renderer 112 may be configured to perform: receiving instructions regarding the rendering mode from the controller 110; receiving the data objects corresponding to the rendering mode from the storage unit 104; receiving the streaming data (which could be referred to as another data object) corresponding to the rendering mode from the decoder 114; and rendering the streaming media on the display 116. The display 116 could be or include a screen on which the streaming media is enjoyed by the user of the user terminal 10.

Figure 3:
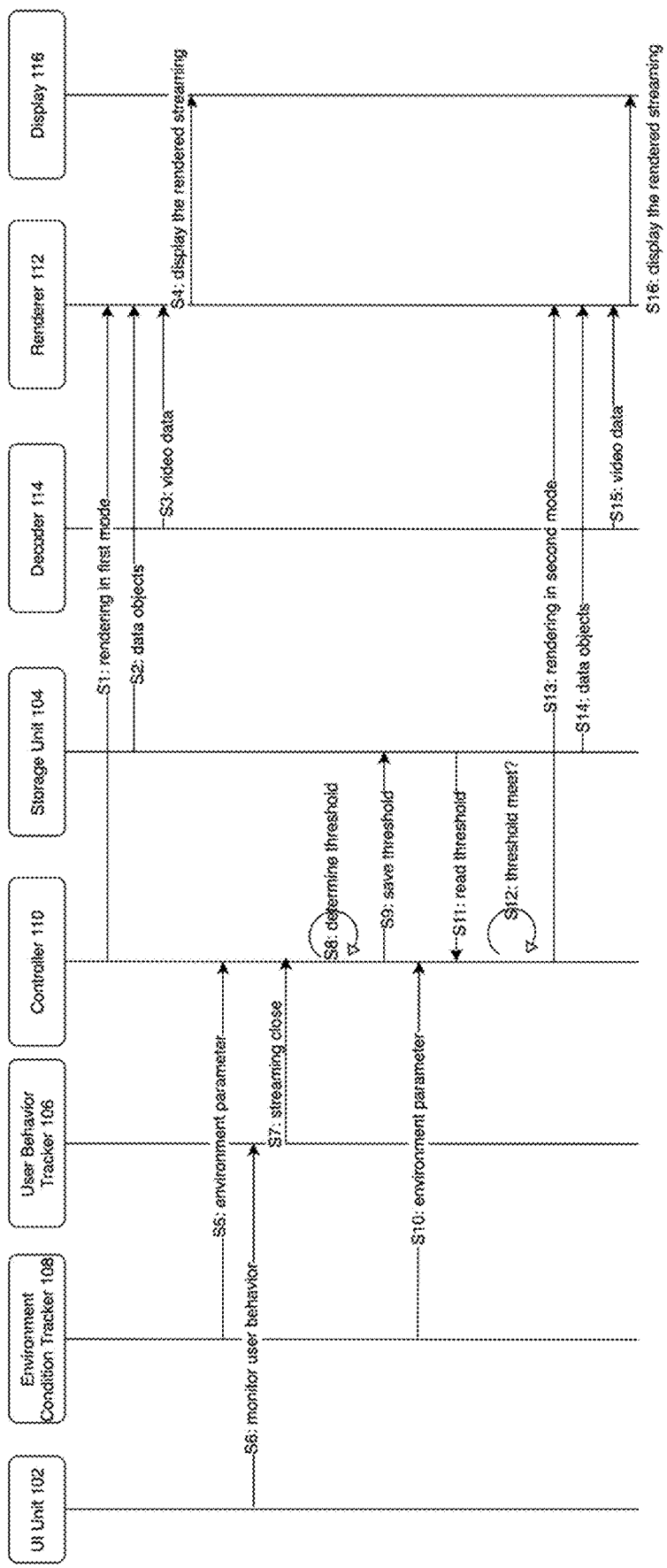
FIG. 3 shows an exemplary sequence chart illustrating an operation of a communication system in accordance with some embodiments of the present disclosure.

FIG. 3 shows an exemplary sequence chart illustrating an operation of the communication system 1 according to some embodiments of the present disclosure.

In step S1, the controller 110 instructs the renderer 112 to render a streaming or a streaming media in a first mode, which may, for example, follow an action of the user to participate in or open a streaming on an APP. In step S2, the renderer 112 receives data objects that correspond to the first mode from the storage unit 104. In step S3, the renderer 112 receives streaming data or video data (which may be from another user) that corresponds to the first mode from the decoder 114. In step S4, the rendered streaming is shown on the display 116.

In some embodiments, the first mode indicates a higher-performance mode, which requires the renderer 112 to include more or higher-grade data objects from the storage unit 104 and/or to acquire a higher-resolution version of streaming data from the decoder 114 for the streaming rendering.

In step S5, the controller 110 receives various environment parameters from the environment condition tracker 108. In step S6, the user behavior tracker 106 monitors the behavior of the user through the UI unit 102. In step S7, the user behavior tracker 106 detects a timing the user closes or turns off the streaming and reports to the controller 110.

In step S8, the controller 110 determines a threshold value for each of the environment parameters based on the timing the user closes the streaming. The threshold values may be used by the controller 110 to compare with subsequent monitored environment parameters for determining a subsequent rendering mode.

In some embodiments, the threshold value of an environment parameter may be determined by a predetermined offset from a received value of the environment parameter at the timing the user closes the streaming. For example, for the parameter of CPU usage rate of the user terminal, if the received CPU usage rate at the timing the user closes the streaming is N1%, the threshold value for the CPU usage rate may be determined to be (N1−T1)%, wherein T1 is a predetermined offset. In some embodiments, T1 could be from 2.5 to 5. For another example, for the parameter of memory usage rate of the user terminal, if the received memory usage rate at the timing the user closes the streaming is N2%, the threshold value for the memory usage rate may be determined to be (N2−T2)%, wherein T2 is a predetermined offset. In some embodiments, T2 could be from 2.5 to 5.

In some embodiments, the environment parameters may include a number of times a freezing or a lag occurs during rendering the streaming in the first mode. A freezing or a lag indicates a pause, stop or delay of the streaming content or the whole user terminal for a period of time such as, for example, 2 to 5 seconds. For example, if within a specified time period (for example, 3, 5, or 10 mins) before the timing the user closes the streaming, the number of times a freezing or a lag is detected is N3, a threshold value of (N3−T3) times may be determined, wherein T3 is a predetermined value which could be, for example, 2, 3 or 5.

In some embodiments, the environment parameters may include a length of time during which the number of frames per second (FPS) with which the streaming is being rendered is below a specified value. For example, if within a specified time period (for example, 3, 5, or 10 mins) before the timing the user closes the streaming, the FPS is below a specified value (for example, 30 frames) for N4 seconds, a threshold value of (N4−T4) seconds may be determined, wherein T4 is a predetermined value which could be, for example, 2 to 5.

In some embodiments, the environment parameters may include a network quality parameter whose value is determined by quality factors such as API response time, TCP connection time, DNS lookup time, SSL Handshake time, and Downstream bandwidth. For example, a score for each of the above factors may be determined according to Table 1 as below, and a value of the network quality parameter may be an average of the scores of the factors which are taken into account. Depending on the actual application or practice, all or some of the factors could be taken into account for determining the network quality parameter. In some embodiments, some quality factors may have higher weights than the others when calculating the network quality parameter.

TABLE 1

| Factor | Performance grade | Definition | Score |
| --- | --- | --- | --- |
| API response time | Poor | >3000 ms | 25 |
| | Moderate | 1000~3000 ms | 50 |

TABLE 1-continued

| Factor | Performance grade | Definition | Score |
|---|---|---|---|
| | Good | 500~1000 ms | 75 |
| | Excellent | <500 ms | 100 |
| TCP connection time | Poor | >12.5 ms | 25 |
| | Moderate | 7.5~12.5 ms | 50 |
| | Good | 5~7.5 ms | 75 |
| | Excellent | <5 ms | 100 |
| DNS lookup time | Poor | >20 ms | 25 |
| | Moderate | 15~20 ms | 50 |
| | Good | 10~15 ms | 75 |
| | Excellent | <10 ms | 100 |
| SSL handshake time | Poor | >12.5 ms | 25 |
| | Moderate | 7.5~12.5 ms | 50 |
| | Good | 5~7.5 ms | 75 |
| | Excellent | <5 ms | 100 |
| Downstream bandwidth | Poor | <150 kbps | 25 |
| | Moderate | 150~550 kbps | 50 |
| | Good | 550~2000 kbps | 75 |
| | Excellent | >2000 kbps | 100 |

In some embodiments, when in the vicinity of the timing the user closes the streaming, if the value of the network quality parameter is N5, a threshold value of (N5+T5) may be determined, wherein T5 is a predetermined value which could be, for example, 5 to 10. The threshold value (N5+T5) may indicate a tighter criterion for subsequent streaming rendering to switch to a lower-performance or a less-demanding mode (such as the second mode) before the network quality parameter drops to the value of N5.

In step S9, the threshold values determined in step S8 are stored in the storage unit 104. In step S10, the controller 110 again receives the environment parameters (or updated environment parameters) from the environment condition tracker 108. In step S11, the controller 110 reads the threshold values of the environment parameters stored in the storage unit 104.

In step S12, the controller 110 compares the threshold values with the environment parameters to see if any environment parameter meets or reaches its threshold value. In some embodiments, if any one of the environments meets its threshold value, the controller 110 will determine to render the streaming in a second mode and instructs the renderer 112 to act accordingly in step S13, which may, for example, follow an action of the user to re-participate in or re-open a streaming on the APP. If no environment parameter meets its threshold value in step S12, the controller 110 determines to keep the first mode rendering and instructs the renderer 112 to act accordingly, and the flow may go back to step S1, which may, for example, follow an action of the user to re-participate in or re-open a streaming on the APP.

In step S14, the renderer 112 receives data objects that correspond to the second mode from the storage unit 104. In step S15, the renderer 112 receives streaming data or video data (which may be from another user) that corresponds to the second mode from the decoder 114. In step S16, the rendered streaming is shown on the display 116.

In some embodiments, the second mode indicates a lower-performance mode, which requires the renderer 112 to include fewer or lower-grade data objects (compared with the first mode) from the storage unit 104 and/or to acquire a lower-resolution or a downgraded version of streaming data (compared with the first mode) from the decoder 114 for the streaming rendering.

In some embodiments, if the environment parameters found to meet their threshold values include the CPU usage rate, the memory usage rate, the number of times a freezing or a lag occurs during rendering the streaming in the first mode, or the length of time during which the FPS with which the streaming is rendered in the first mode is below a predetermined value, the second mode instructed by the controller 110 will include fewer gifts, special effects, game functions, avatars, or animations for rendering compared with the first mode. Rendering the streaming with fewer gifts, special effects, game functions, avatars, or animations may relieve or alleviate the user terminal's burden regarding the CPU usage rate and the memory usage rate, may reduce the number of times a freezing or a lag may happen, or may reduce the length of time the FPS is below a preferred or satisfying value. This rendering mode adaptation may prevent the user from closing or leaving the streaming due to unsmooth rendering and may improve the user experience.

In some embodiments, if the environment parameters found to meet their threshold values include the network quality parameter determined by the API response time, the TCP connection time, the DNS lookup time, the SSL handshake time and/or the downstream bandwidth, the second mode instructed by the controller 110 may include a downgraded version of video data from another user (for example, 360p or 480p) for rendering compared with the video data used in the first mode (for example, 720p). Rendering the streaming with a downgraded version of video data may relieve or alleviate the user terminal's burden regarding the network connection condition. This rendering mode adaptation may prevent the user from closing or leaving the streaming due to unsmooth rendering and improve the user experience.

Figure 4:
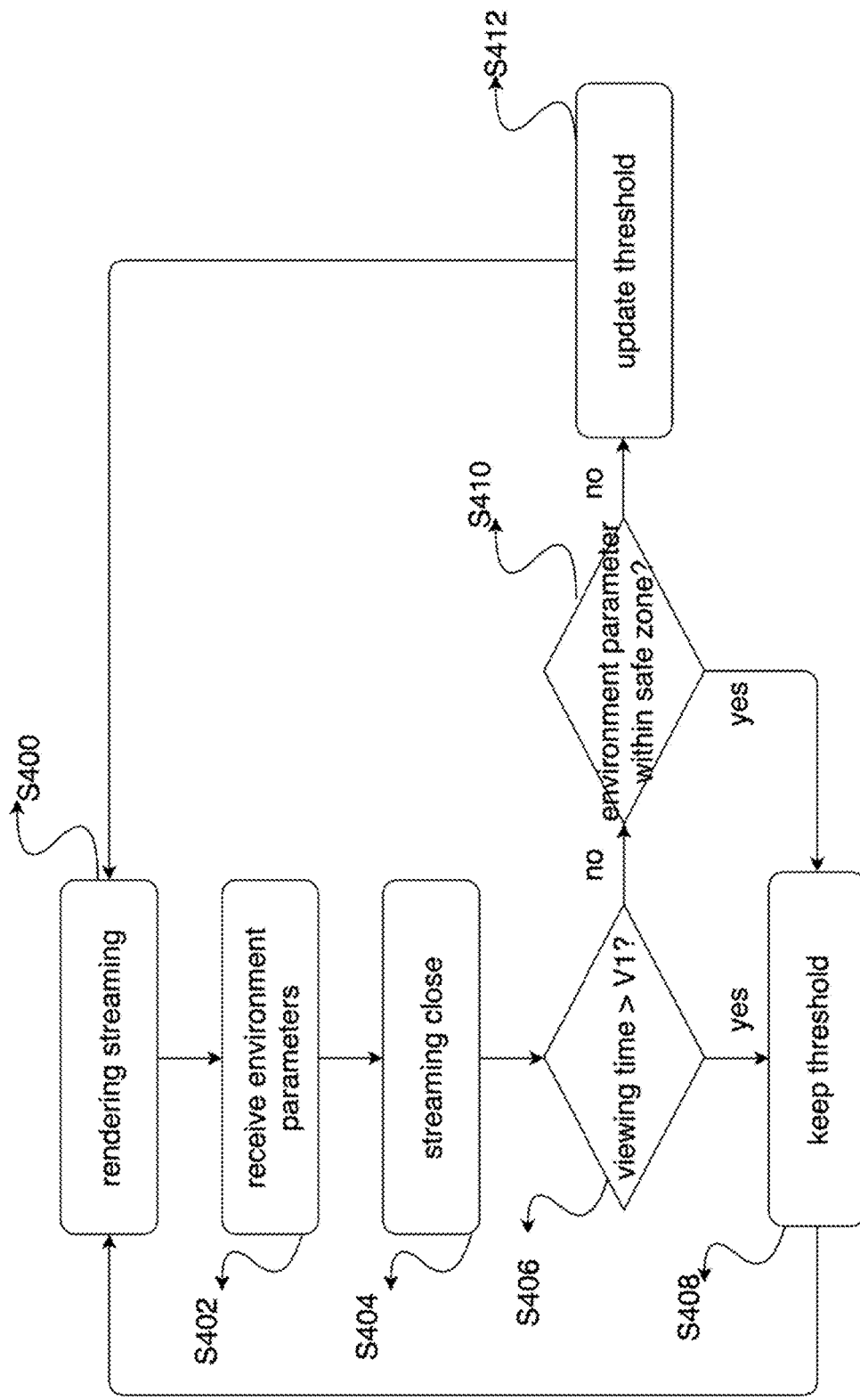
FIG. 4 shows a flowchart illustrating a process in accordance with some embodiments of the present disclosure.

FIG. 4 is a flowchart illustrating a process in accordance with some embodiments of the present disclosure. FIG. 4 shows how the threshold values for the environment parameters may be dynamically updated with respect to each user terminal.

In step S400, the streaming is being rendered, which could be in the first mode, the second mode or any default mode. In step S402, the environment parameters are monitored, for example, by the environment condition tracker 108. In step S404, a close of the streaming is detected, for example, by the user behavior tracker 106.

In step S406, the viewing time of the streaming is compared with a predetermined time period V1, which may be performed by the controller 110, for example. If the viewing time is greater than or equal to V1, then the flow goes to step S408, wherein the threshold values for all parameters are kept unchanged. In this situation, the user is judged to have left the streaming for a reason not related to the monitored environment parameters, and therefore there is no need to update or tighten the threshold values of the environment parameters, which will be used for determining the rendering mode in subsequent streaming viewing. For example, a viewing time greater than the predetermined time period V1 may indicate that the user has already been satisfied with the streaming. In some embodiments, the predetermined time period V1 may be greater than 30 mins or greater than 60 mins.

If the viewing time is found to be less than the predetermined time period V1 in step S406, the close of the streaming may be viewed as related to the environment parameters and the flow goes to step S410.

In step S410, the monitored environment parameters are checked, by the controller 110, for example, to see if the values are within their respective safe zones. If all environment parameters are within their safe zones, the flow goes to step S408, wherein the threshold values for all parameters are kept unchanged. If any environment parameter is greater than or exceeds its safe zone, the flow goes to step S412.

A safe zone is a range of the corresponding environment parameter that is considered to be unlikely to cause the user terminal overburdened for the streaming rendering. That is, if a detected environment parameter is in its safe zone when the streaming is closed, that environment parameter will not be considered as the reason for a possibly bad viewing experience that results in the streaming close, and hence there is no need to update or tighten the threshold value of the the environment parameter, which will be used for determining the rendering mode for subsequent streaming. The range for each safe zone may be defined according to practical application. An example is shown in Table 2 as below.

TABLE 2

| Environment parameter | Safe zone |
|---|---|
| CPU usage rate | ≤45% |
| Memory usage rate | ≤60% |
| Number of times a freezing or lag occurs | ≤5 times (within a specified time period) |
| Length of time the FPS is below a predetermined value | >45 |
| Network quality parameter | Score ≥75 |

In step S412, environment parameters that are found to be outside of their respective safe zones will be given updated thresholds. Examples of methods of threshold updating are given in the description regarding step S8 in FIG. 3, and similar methods can be applied in step S412.

For an environment parameter that is outside of the safe zone, it is likely that the user closed the streaming due to that specific environment parameter reaching a value that impairs or deteriorates the viewing experience for that user. For example, the viewing experience may be impaired when the CPU usage rate reaches 80%, which may happen when the user concurrently operates various applications. Therefore, an updated tighter threshold of that environment parameter for that specific user is needed to prevent the user from leaving a streaming for the same reason in subsequent streaming viewing. For example, the threshold value of the environment parameter CPU usage rate for that specific user terminal may be updated to 75%, which is (80-5)%. In this way, next time the user is viewing a streaming, when the CPU usage rate climbs to meet 75%, the rendering mode will be switched (for example, switched to the second mode described above) to incorporate fewer data objects (such as gifts, game functions, avatars or special effects) or an downgraded version of a data object (such as a streaming data or video data from another user) to alleviate or relieve the user terminal's burden and to keep a satisfying viewing experience.

After step S408 or step S412, the flow may go back to step S400 for subsequent streaming rendering, which may, for example, follow when the user terminal initiates streaming next time.

Embodiments of the present disclosure disclose a method, a system, and a computer-readable medium for dynamically or adaptively switching the rendering mode for streaming on a user terminal, based on monitored environment parameters of that user terminal, to ensure a satisfying viewing experience on that specific user terminal. The monitored environment parameters are compared with their respective threshold values to determine whether it is necessary to switch the rendering mode to alleviate the user terminal for a smooth rendering. The setting of threshold values of the environment parameters for each user could be very different, because they are set according to the relation or correlation between each user's behavior and the monitored environment parameters of the user terminal of that user.

Different users may have different tolerance levels regarding different environment parameters. For example, if user A always turned off the streaming when the network quality parameter reaches or deteriorates to 70 and user B always turned off the streaming when the network quality parameter reaches or deteriorates to 60, the threshold values of the network quality parameters for user A and user B may be set to be 75 (70+5) and 65 (60+5). The threshold values for each user terminal are dynamically adjusted continuously as described above, according to each user's behavior or preference. By dynamically switching the rendering mode based on the threshold values of various environment parameters which are customized for each user terminal, the present disclosure can effectively maximize the satisfaction of streaming viewing for each user.

In some embodiments, there may be a study time period before setting the threshold values of the environment parameters. A study time period is a time period during which a user's closing of streaming will not be used instantly to determine or update the threshold value. For example, during an initial stage of a user viewing streaming in the APP, the study time period allows the system or the APP to learn the behavior pattern of the user (or user terminal). During the learning process, through several rounds of streaming viewing, the APP may catch or calculate the correlation between a behavior of the user (such as closing the streaming) and various environment parameters. Therefore, the concerning level or tolerance level of the user regarding each environment parameter can be figured out to determine a priority or a tightening level of threshold setting for the various environment parameters. In some embodiments, the study time period may be a predetermined time period which could be, for example, 1 week or 1 month. In some embodiments, the study time period may be a variable time period until the user terminal finishes X1 times of streaming viewing, wherein X1 could be, for example, 5 to 10 times.

For example, during the study time period, if user A is found to be more affected by the network quality parameter, that is, the closing behavior is highly correlated with a lower value of the network quality parameter and is less correlated with other environment parameters, then a threshold for the network quality parameter may be set before setting the threshold values for other environment parameters. This mechanism may prevent the situation of unnecessarily downgrading the streaming (for example, from a first mode to a second mode) due to variations of other environment parameters which are not concern points for that user.

In some embodiments, there may be a mechanism with which the threshold values of the environment parameters could be relieved or loosened, by the controller 110, for example, when some conditions are met. For example, when an environment parameter meets its threshold value and the streaming is switched to a lower-performance rendering mode accordingly, there may be an option on the APP providing the streaming for the user to execute to return to the normal/default or higher-performance rendering mode, regardless of the possibly deteriorated viewing experience due to the environment parameter meeting or exceeding its threshold value.

In some embodiments, if a user consecutively (for example, for a consecutive 3 or 5 times) executes the above option to insist on a higher-performance rendering mode with respective to a specific environment parameter (despite that the environment parameter already meets its threshold value), then the threshold of that environment parameter may be set looser for subsequent streaming rendering to cater to that user's personal preference. For example, in the case that the environment parameter is the CPU usage rate, the threshold value may be loosened from 70% to 75% if the user consecutively executes the option to return to the higher-performance rendering mode every time the rendering mode is downgraded because the CPU usage rate reaches the original threshold value 70%.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

In some embodiments, the factors, sub-scores, scores and weights may include a decay factor that causes the strength of the particular data or actions to decay with time, such that more recent data or actions are more relevant when calculating the factors, sub-scores, scores and weights. The factors, sub-score, scores and weights may be continuously updated based on continued tracking of the data or actions. Any type of process or algorithm may be employed for assigning, combining, averaging, and so forth the score for each factor and the weights assigned to the factors and scores. In particular embodiments, the highlight detection unit 35 may determine factors, sub-scores, scores and weights using machine-learning algorithms trained on historical data, historical actions and past user terminal responses, or data collected from user terminals by exposing them to various options and measuring responses. In some embodiments, the factors, sub-scores, scores and weights may be decided in any suitable manner.

A TTL of a data object governs the refresh rate of the data object (or a copy of the data object) on a cache server, ideally ensuring that "stale" versions of the data object aren't served to visitors visiting the application or the website wherein the data object can be accessed. A TTL directly impacts a page load time of an application or a website (i.e., cached data loads faster), as well as content freshness (i.e., data cached for too long can become stale).

Static files or data objects (e.g., image files, PDFs, etc.) are rarely updated, and therefore usually have a longer TTL. For example, an ecommerce site's collection of product images represents static content. Because they're rarely refreshed, it's safe to cache them for an extended period (e.g., days or weeks). This makes setting their TTL predictable and easy to maintain.

Conversely, dynamic contents or data objects (e.g. HTML files) are constantly updated, complicating the setting of accurate TTLs. For example, a comment section under a product is considered dynamic, as it changes frequently. If the TTL is set too long, then the comments cannot be reflected in time.

Another concern point of the TTL setting is the number of users accessing the data object. If a TTL is set too short while there are still a lot of users trying to access the corresponding data object, there would be a risk that, when the TTL ends, many of the users would need to access the origin server for the data object (which may be done by directly accessing the origin server or by accessing the origin server through the cache server) because they could not get the response at the cache server. When the origin server is accessed by a number of users that exceeds a maximum capacity the origin server can support, which usually results in an overwhelmed or overburdened number of query per second (QPS) for the origin server, there may be a crashdown of the server or, some of the users can't achieve the data access successfully.

Therefore, how to determine the TTL on a cache server for a data object based on factors such as the update frequency of the data object or the number of users accessing the data object is crucial as to providing the freshest data, preventing access fails for the users, or protecting the origin server from being out of function. In some embodiments, a data object can be referred to as a resource or a resource data.

Figure 5:
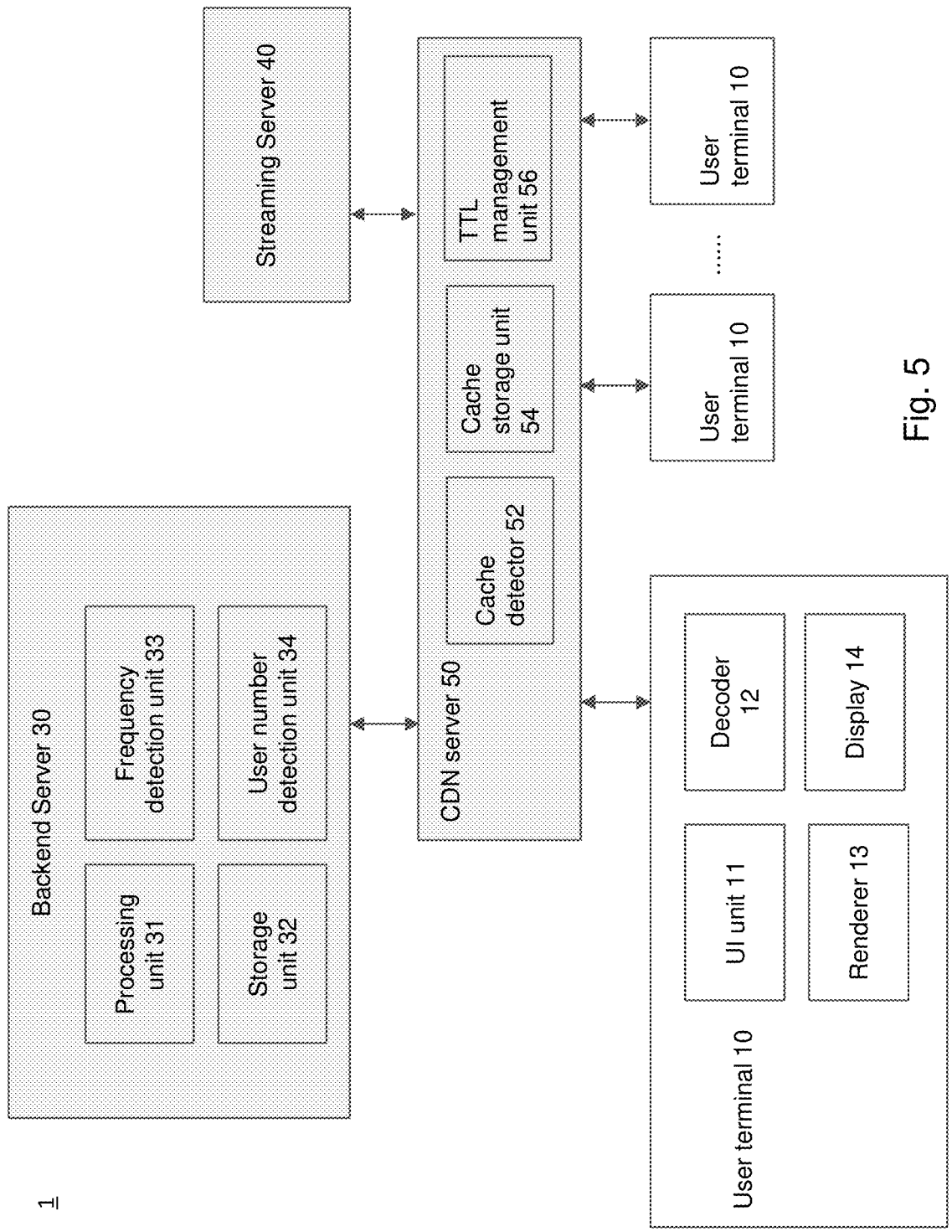
FIG. 5 shows an exemplary functional configuration of a communication system according to some embodiments of the present disclosure.

FIG. 5 shows an exemplary functional configuration of the communication system 1. In FIG. 5, the network 90 is omitted and a CDN server 50 is shown to connect the user terminals 10 and the backend server 30. The CDN server 50 could be part of the network 90. In some embodiments, the CDN server 50 may function as a cache server.

In this embodiment, the user terminal 10 includes a UI unit 11, a decoder 12, a renderer 13, and a display 13. The user terminal 10 may access the backend server 30 and the streaming server 40 for their data objects through the CDN server 50 by, for example, sending API requests and receiving API responses. The decoder 12 decodes the received data objects, which could be a streaming data, for the renderer 13 to generate the video to be displayed on the display 14. The display 14 represents or shows the video on the computer screen of the user terminal 10. The UI unit 11 is configured to interact with a user of the user terminal 10, for example, to receive operations of the user with respect to the application. In some embodiments, the user terminal 10 may include an encoder (not shown) for encoding the video to generate streaming data.

The CDN server 50 in the embodiment shown in FIG. 5 includes a cache detector 52, a cache storage unit 54, and a TTL management unit 56. The cache detector 52 is configured to check if the CDN server 50 has a requested data object or resource in store from a previously fetching or accessing. The cache storage unit 54 is configured to store data objects (or copies of data objects) from the backend server 30 and/or the streaming server 40 previously fetched by a user terminal 10. The TTL management unit 55 manages the TTL or the time period to be stored in the cache storage unit 54 for each data object.

For example, when the CDN server 50 receives a request, such as an API request, from the user terminal 10 to access a data object in the backend server 30, the cache detector 52 may execute a mapping operation or a comparison operation to detect if the requested data object is stored in the cache storage unit 54. If the requested data object can be found in the cache storage unit 54, which may be referred to as a cache hit, the CDN server 50 transmits the stored data object, or the cached data object, to the user terminal 10, without accessing the backend server 30. If the requested data object can not be found in the cache storage unit 54, which may be referred to as a cache miss, the CDN server 50 may pass the request to the backend server 30 to access the data object. A cache miss may happen when the data object is requested for the first time or the TTL for the data object stored in the cache storage unit 54 (from previously fetching) has expired.

The backend server 30 in the embodiment shown in FIG. 5 includes a processing unit 31, a storage unit 32, a frequency detection unit 33, and a user number detection unit 34. The backend server 30 receives requests from the CDN server 50 and replies with the corresponding data objects. The backend server 30 may receive an API request from the CDN server 50 and return an API response. The API response may include the requested data object and its corresponding TTL information. The TTL information could be used in the TTL management unit 56 to set the TTL for the data object stored in the cache storage unit 54.

The storage unit 32 may store various data and programs, including data objects that would be accessed by the user terminal 10 through the CDN server 50. The frequency detection unit 33 is configured to detect or receive an update frequency of a data object. In some embodiments, the frequency detection unit 33 may access an external statistical system, such as Datadog, for the update frequency, which may be done by an API request. The user number detection unit 34 is configured to detect or receive a number of users accessing a data object. In some embodiments, the user number detection unit 34 may access an external database, such as a Datadog database, for the number of users, which may be done by an API request. The processing unit 31 is configured to, among many other functions, determine a TTL for a data object that is to be updated or responded to the CDN server 50 in response to the request from the CDN server 50. In some embodiments, the processing unit 31 determines the TTL based on the update frequency of the data object and/or the number of users accessing the data object.

In some embodiments, the processing unit 31 is configured as a CPU, a GPU, or the like, reads various programs that may be part of an APP and are stored in the storage unit 32, and executes various kinds of commands or machine-readable instructions included in the programs. In some embodiments, each of the above components included in the backend server 30 can be viewed as a processing unit or a processor.

In some embodiments, the backend server 30 is an origin server for an application providing live streaming service. In this case, data objects in the backend server 30 may include a data object representing or corresponding to a leaderboard of streamers, a data object representing or corresponding to a comment or message information, and/or a data object representing or corresponding to a page of the application, which could be a popular page or a hot page accessed by many users. Data objects in the streaming server 40 may include streaming data from streamers.

Figure 6:
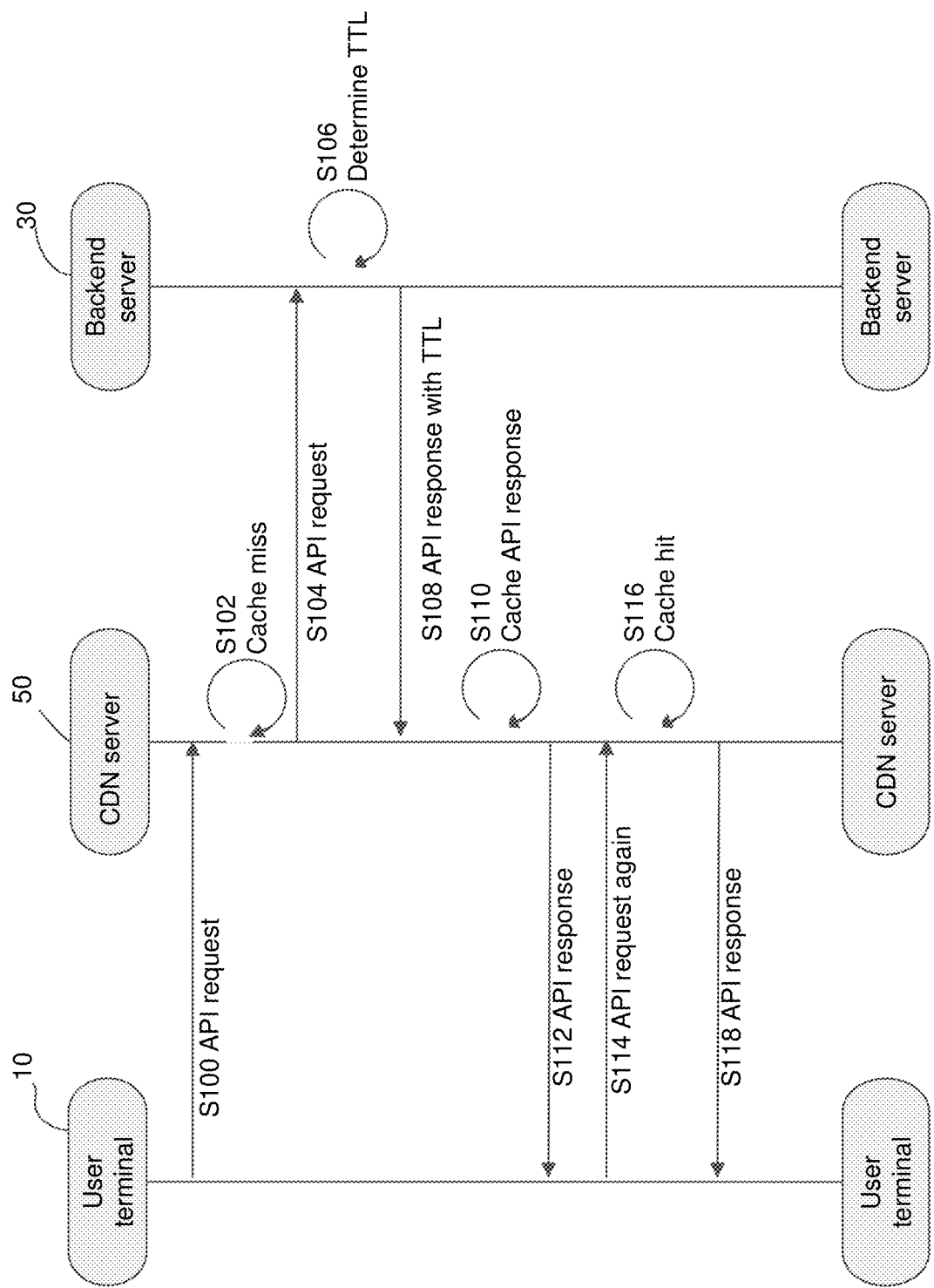
FIG. 6 shows an exemplary sequence chart illustrating an operation of a communication system in accordance with some embodiments of the present disclosure.

FIG. 6 shows an exemplary sequence chart illustrating an operation of a communication system in accordance with some embodiments of the present disclosure. In some embodiments, FIG. 6 represents how a data object in a backend server is copied, updated or transmitted to a CDN server in response to a request from a user terminal.

In step S100, the user terminal 10 transmits an API request to the CDN server 50 to request for a data object or a resource which, for example, could represent or correspond to a page, a leaderboard or a message section of an application or a website.

In step S102, the CDN server 50 determines if the requested data object is in store. For example, the cache detector 52 may perform a searching operation or a mapping operation to determine whether the requested data object is stored in the cache storage unit 54. In this embodiment, the requested data object cannot be found in the cache storage unit 54, which results in a cache miss, and the flow goes to step S104.

In step S104, the CDN server 50 transmits an API request (or passes the API request of the user terminal 10) to the backend server 30 for the data object requested by the user terminal 10.

In step S106, the backend server 30 prepares or retrieves the requested data object and determines a TTL for the data object, which governs how long the data object would be stored on the CDN server 50. Details regarding TTL determination will be described later.

In step S108, the backend server 30 transmits an API response to the CDN server 50, which at least includes the requested data object (copy of the data object) and the corresponding TTL information. The TTL information will be used by the TTL management unit 56 of the CDN server 50 to manage the time length of storage for the data object.

In step S110, the CDN server 50 receives the API response, which includes the requested data object and its TTL information, from the backend server 30. The CDN server 50 may store the data object in the cache storage unit 54 and set the corresponding TTL in the TTL management unit 56 according to the TTL information.

In step S112, the CDN server 50 transmits an API response to the user terminal 10, which at least includes the requested data object. Till now, an exemplary round of accessing a data object has been completed and the user terminal 10 may use the received data object for an operation in an application, for example, for checking a leaderboard, viewing a page of the application, or getting the latest comment information.

In step S114, the user terminal 10 again transmits an API request to the CDN server 50 for accessing the same data object, which may follow a periodic need or trigger in the application to update a page, a leaderboard or a comment section.

In step S116, the CDN server 50 determines if the requested data object is in store. For example, the cache detector 52 may perform a searching operation or a mapping operation to determine whether the requested data object is stored in the cache storage unit 54. In this example, the previously fetched or accessed data object has been stored in the cache storage unit 54 in step S110, and the corresponding TTL has not expired yet. Therefore, the requested data object can be found in the cache storage unit 54, which results in a cache hit, and the flow goes to step S118 without the need to access the backend server 30.

In step S118, the CDN server 50 transmits an API response to the user terminal 10, which at least includes the requested data object stored in the cache storage unit 54. In this case, the content of the data object is not changed.

Figure 7:
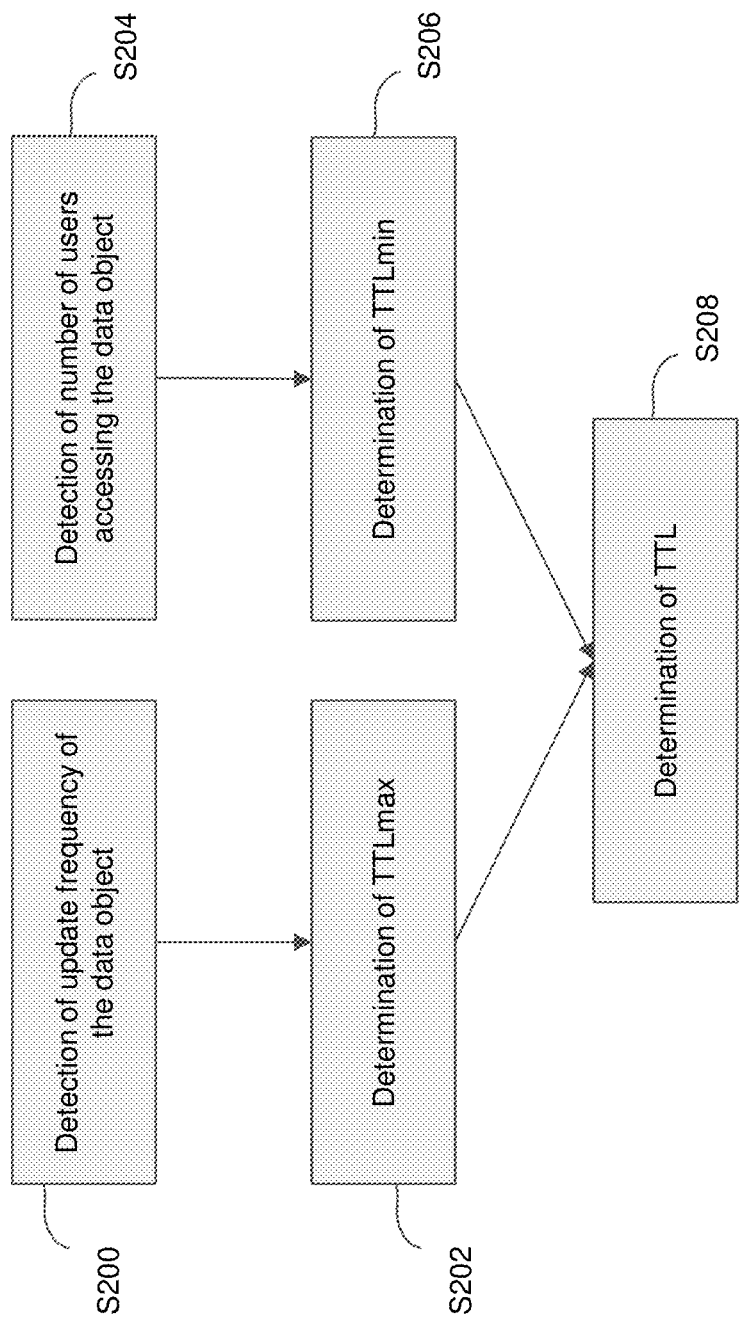
FIG. 7 shows a flowchart illustrating a process in accordance with some embodiments of the present disclosure.

FIG. 7 shows a flowchart illustrating a process in accordance with some embodiments of the present disclosure. FIG. 7 shows how the TTL for the accessed data object may be determined by the backend server 30 in step S106 in FIG. 6.

In step S200, an update frequency of the requested data object is detected or received, for example, by the frequency detection unit 33 of the backend server 30. In some embodiments, the frequency detection unit 33 may access an external database, such as a Datadog database, for the update frequency, which may be done by an API request. The data object may be updated in various ways. For example, a data object corresponding to a leaderboard or a comment section could be updated by posts or input information from various user terminals into a database managing or holding the data object, which could be the backend server or a separate database. As another example, a data object corresponding to a hot page or a popular page of an application could be updated by the backend server of the application, therefore there may be no need to access another database for the update frequency.

In step S202, a maximum time to live TTLmax is determined based on the update frequency of the data object, for example, by the processing unit 31 of the backend server 30. In some embodiments, the TTLmax is determined to be shorter when the update frequency of the data object increases. In some embodiments, the TTLmax is inversely proportional to the update frequency. In some embodiments, the TTLmax is determined to be equal to or less than a reciprocal of the update frequency of the data object. For example, if the update frequency is 2 times per second, the TTLmax may be equal to or less than ½ second. For another example, if the update frequency is 1 time for every 5 seconds, the TTLmax may be equal to or less than 5 seconds. In some embodiments, signal transmission latency in the Internet can be taken into account and the TTLmax may be set to have a predetermined offset from the reciprocal of the update frequency, wherein the predetermined offset is used to cover or compensate for the signal transmission latency or an API response time and could be determined according to actual practice such as network conditions. For example, if the update frequency is 1 time for every 5 seconds, the TTLmax may be equal to (5−2) seconds, wherein 5 is the reciprocal of the frequency and 2 is the predetermined offset.

In step S204, a number of users accessing the data object is detected or received, for example, by the user number detection unit 34 of the backend server 30. In some embodiments, the user number detection unit 34 may access an external database, such as a Datadog database, for the number of users, which may be done by an API request.

In step S206, a minimum time to live TTLmin is determined based on the number of users accessing the data object, for example, by the processing unit 31 of the backend server 30. In some embodiments, the TTLmin is determined to be longer when the number of users accessing the data object increases. In some embodiments, the TTLmin is determined such that an estimated QPS from the number of users reaching the backend server providing the data object after the TTLmin expires is below a maximum QPS capacity of the backend server.

In step S208, a TTL for the data object is determined based on the maximum time to live TTLmax and the minimum time to live TTLmin, for example, by the processing unit 31 of the backend server 30. In some embodiments, the TTL is determined to be equal to or greater than the TTLmin. In some embodiments, the TTL is determined to be equal to or less than the TTLmax. In some embodiments, the TTL is determined to be equal to or less than the TTLmax and equal to or greater than the TTLmin. In some embodiments, the TTL is determined to be TTLmin if TTLmax is equal to or less than TTLmin.

In some embodiments, the maximum time to live TTLmax sets a maximum value for the TTL, thereby to make sure the user terminal always gets the latest version of the data object. For a data object with a higher update frequency, the corresponding TTLmax would be set shorter and the data object would exist for a shorter time on the CDN server. Therefore, requests of the data object from user terminals would need to go through the CDN server to access the backend server (once the TTLmax expires and the data object cannot be found on the CDN server) at a higher frequency to get the latest version of the data object. In some embodiments, for a data object with a lower update frequency, the corresponding TTLmax would be set longer and the data object would exist for a longer time on the CDN server. Therefore, requests of the data object from user terminals would need to go through the CDN server to access the backend server (once the TTLmax expires and the data object cannot be found on the CDN server) at a lower frequency, which may release a burden for the backend server.

In some embodiments, the update frequency of the data object may be monitored or tracked constantly or periodically, for example, by the frequency detection unit 33 of the backend server 30 in FIG. 5. The processing unit 31 may utilize the constantly monitored update frequency to determine the TTLmax constantly, and then determine the TTL based on the TTLmax and the TTLmin. In some embodiments, the backend server 30 may constantly update the TTL information to the CDN server 50 to set the TTL for the corresponding data object stored in the CDN server 50. In some embodiments, the backend server 30 may update the TTL information to the CDN server 50 once a change in the update frequency of the data object is detected, to ensure that the data object accessed by the user terminal is at its latest version. In some embodiments, the TTL update may not need a request from the CDN server 50.

In some embodiments, the minimum time to live TTLmin sets a minimum value for the TTL, thereby to prevent the backend server from being overwhelmed or overburdened by requests from the user terminals, for example, in a timing right after the TTLmin expires and/or in a timing before the data object is transmitted or copied to the cache server. For a data object accessed by a greater number of user terminals, the corresponding TTLmin would be set longer and the data object would exist for a longer time on the CDN server. Therefore, requests of the data object from user terminals would not need to go through the CDN server to access the backend server for a longer time period when the number of users accessing the data object is still high, and the risk of backend server crashdown or access failure can be reduced.

In some embodiments, the TTLmin may be determined by an estimated number of users that are going to access the corresponding data object in an upcoming timing, which may be, for example, 10 seconds, 30 seconds, or 1 min later. The estimated number of users may be achieved by various estimation mechanisms, which may include machine learning algorithms trained by historical data such as user behavioral data, application events data and/or their correlation data. For example, the TTLmin can be set to a length after which the number of users accessing the data object is estimated or expected to decrease to a level that would not put the backend server at a crashdown risk or would not cause access failures.

In some embodiments, the number of users accessing the data object may be monitored or tracked constantly or periodically, for example, by the user number detection unit 34 of the backend server 30 in FIG. 5. The processing unit 31 utilizes the constantly monitored number of accessing users to determine the TTLmin constantly, and then determine the TTL based on the TTLmax and the TTLmin. In some embodiments, the backend server 30 may constantly update the TTL information to the CDN server 50 to set the TTL for the corresponding data object stored in the CDN server 50. In some embodiments, the TTL update may not need a request from the CDN server 50. For example, for a data object that is expected to be accessed by a large number of users (for example, a data object corresponding to a hot page of an application), the backend server 30 may continuously or constantly update the TTL setting according to the number of accessing users in real-time. As described above, the determination of TTL always takes the latest number of accessing users into consideration and therefore can minimize the risk of backend server crashdown or accessing failures after the TTL expires in the CDN server. In some embodiments, the TTLmin (and hence the TTL) may be determined and/or updated to the CDN server more frequently when the corresponding data object is accessed by more user terminals.

There may be a situation wherein the TTLmax is equal to or less than the TTLmin. For example, if a data object has a high update frequency and is accessed by a large number of users, the data object may have a short TTLmax and a long TTLmin. In some embodiments, the TTL would be determined to be TTLmin if the TTLmax is equal to or less than the TTLmin. That is, in some embodiments, TTLmin may have a higher priority or importance weight than TTLmax when determining the TTL, since one purpose for TTLmin is to protect the backend server from being overburdened or crashed.

Another benefit of determining the TTL based on the TTLmin is that a complicated mechanism for alleviating the burden for the backend server may be omitted or simplified. For example, a rate limiting mechanism or an implementation of extra backend servers may be saved. In some embodiments, a server load balancing mechanism which may need extra infrastructure implementation or a complicated cache server with the ability to efficiently distribute or balance loading for the backend server may be saved. Therefore, the cost of operating the corresponding application can be saved.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

DESCRIPTION OF REFERENCE NUMERALS

| | |
|---|---|
| 1 | Communication system |
| 10 | User terminal |
| 102 | UI unit |
| 104 | Storage Unit |
| 106 | User Behavior Tracker |
| 108 | Environment Condition Tracker |
| 110 | Controller |
| 112 | Renderer |
| 114 | Decoder |
| 116 | Display |
| 30 | Backend server |
| 40 | Streaming server |
| 90 | Network |
| 11 | UI unit |
| 12 | Decoder |
| 13 | Renderer |
| 14 | Display |
| 30 | Backend server |
| 31 | Processing unit |
| 32 | Storage unit |
| 33 | Frequency detection unit |
| 34 | User number detection unit |
| 40 | Streaming server |
| 50 | CDN server |
| 52 | Cache detector |
| 54 | Cache storage unit |
| 56 | TTLmanagement unit |
| 90 | Network |

The present techniques will be better understood with reference to the following enumerated embodiments:

A1. A method for rendering a streaming on a user terminal, comprising: rendering the streaming in a first mode; receiving an environment parameter of the user terminal; receiving a timing when the user terminal closes the streaming; determining a threshold value of the environment parameter based on the timing the user terminal closes the streaming; receiving an updated environment parameter of the user terminal; and rendering the streaming in a second mode if the updated environment parameter meets the threshold value; wherein the second mode includes fewer data objects than the first mode or includes a downgraded version of a data object in the first mode for the rendering.

A2. The method according to A1, wherein the threshold value of the environment parameter is determined by a predetermined offset from a value of the environment parameter at the timing the user terminal closes the streaming.

A3. The method according to A2, wherein the environment parameter is a CPU usage rate of the user terminal or a memory usage rate of the user terminal.

A4. The method according to A2, wherein the environment parameter is a number of times a freezing or a lag occurs during rendering the streaming in the first mode within a specified time period before the timing the user closes the streaming.

A5. The method according to A2, wherein the environment parameter is a length of time during which a number of frames per second with which the streaming is rendered in the first mode is below a predetermined time period.

A6. The method according to A2, wherein the environment parameter is a network quality parameter determined by quality factors including an API response time, a TCP connection time, a DNS lookup time, an SSL Handshake time, or a Downstream bandwidth.

A7. The method according to A1, wherein the data objects include a gift, a special effect, a game function, an avatar, an animation, or a video data from another user.

A8. The method according to A3, 4 or 5, wherein the data objects include gifts, special effects, game functions, avatars, or animations, and the second mode includes fewer data objects than the first mode for the rendering.

A9. The method according to A6, wherein the data objects include video data from another user, and the second mode includes a downgraded version of the video data from another user for the rendering.

A10. The method according to A6, wherein a score for each quality factor is defined according to a performance grade of the quality factor, and a value of the network quality parameter is determined to be an average of the scores of the quality factors.

A11. The method according to A1, wherein the determining a threshold value of the environment parameter comprises: defining a safe zone for the environment parameter; determining if the environment parameter is within the safe zone at the timing the user terminal closes the streaming; keeping the threshold value unchanged if the environment parameter is within the safe zone at the timing the user terminal closes the streaming; and tightening the threshold value if the environment parameter is outside of the safe zone at the timing the user terminal closes the streaming.

A12. The method according to A1, further comprising: receiving a plurality of environment parameters of the user terminal in a study time period; receiving a plurality of timings when the user terminal closes the streaming in the study time period; calculating a correlation between the user terminal closing the streaming and each environment parameter; and determining a threshold value of an environment parameter with the highest correlation regarding the user terminal closing the streaming before determining threshold values of the rest environment parameters.

A13. A system for rendering a streaming on a user terminal, comprising one or a plurality of processors, wherein the one or plurality of processors execute a machine-readable instruction to perform: rendering the streaming in a first mode; receiving an environment parameter of the user terminal; receiving a timing when the user terminal closes the streaming; determining a threshold value of the environment parameter based on the timing the user terminal closes the streaming; receiving an updated environment parameter of the user terminal; and rendering the streaming in a second mode if the updated environment parameter meets the threshold value; wherein the second mode includes fewer data objects than the first mode or includes a downgraded version of a data object in the first mode for the rendering.

A14. The system according to A13, wherein the threshold value of the environment parameter is determined by a predetermined offset from a value of the environment parameter at the timing the user terminal closes the streaming.

A15. The system according to A13, wherein the environment parameter is a CPU usage rate or the user terminal, a memory usage rate of the user terminal, a number of times a freezing or a lag occurs during rendering the streaming in the first mode within a specified time period before the timing the user closes the streaming, a length of time during which a number of frames per second with which the streaming is rendered in the first mode is below a predetermined time period, or a network quality parameter determined by quality factors including an API response time, a TCP connection time, a DNS lookup time, an SSL Handshake time, or a Downstream bandwidth.

A16. The system according to A13, wherein the data objects include a gift, a special effect, a game function, an avatar, an animation, or a video data from another user.

A17. The system according to A13, wherein the determining a threshold value of the environment parameter comprises: defining a safe zone for the environment parameter; determining if the environment parameter is within the safe zone at the timing the user terminal closes the streaming; keeping the threshold value unchanged if the environment parameter is within the safe zone at the timing the user terminal closes the streaming; and tightening the threshold value if the environment parameter is outside of the safe zone at the timing the user terminal closes the streaming.

A18. The system according to A13, wherein the one or plurality of processors execute the machine-readable instruction to further perform: receiving a plurality of environment parameters of the user terminal in a study time period; receiving a plurality of timings when the user terminal closes the streaming in the study time period; calculating a correlation between the user terminal closing the streaming and each environment parameter; and determining a threshold value of an environment parameter with the highest correlation regarding the user terminal closing the streaming before determining threshold values of the rest environment parameters.

A19. A non-transitory computer-readable medium including a program for rendering a streaming on a user terminal, wherein the program causes one or a plurality of computers to execute: rendering the streaming in a first mode; receiving an environment parameter of the user terminal; receiving a timing when the user terminal closes the streaming; determining a threshold value of the environment parameter based on the timing the user terminal closes the streaming; receiving an updated environment parameter of the user terminal; and rendering the streaming in a second mode if the updated environment parameter meets the threshold value; wherein the second mode includes fewer data objects than the first mode or includes a downgraded version of a data object in the first mode for the rendering.

B1. A method for determining a time to live (TTL) for a data object on a cache server, comprising: detecting an update frequency of the data object; detecting a number of users accessing the data object; and determining the TTL based on the update frequency and the number of users.

B2. The method according to B1, further comprising determining a minimum time to live (TTLmin) based on the number of users accessing the data object, wherein the TTLmin is determined to be longer when the number of users accessing the data object increases, and the TTL is determined to be equal to or greater than the TTLmin.

B3. The method according to B1, further comprising determining a maximum time to live (TTLmax) based on the update frequency of the data object, wherein the TTLmax is determined to be shorter when the update frequency of the data object increases, and the TTL is determined to be equal to or less than the TTLmax.

B4. The method according to B1, further comprising: determining a minimum time to live (TTLmin) based on the number of users accessing the data object, wherein the TTLmin is determined to be longer when the number of users accessing the data object increases; and determining a maximum time to live (TTLmax) based on the update frequency of the data object, wherein the TTLmax is determined to be shorter when the update frequency of the data object increases, and the TTL is determined to be equal to or less than the TTLmax and equal to or greater than the TTLmin.

B5. The method according to B4, wherein the TTL is determined to be TTLmin if the TTLmax is equal to or less than TTLmin.

B6. The method according to B2, wherein the TTLmin is determined such that an estimated maximum query per second (QPS) from the number of users reaching a backend server providing the data object after the TTLmin expires is below a maximum QPS capacity of the backend server.

B7. The method according to B3, wherein the TTLmax is determined to be equal to or less than a reciprocal of the update frequency of the data object.

B8. The method according to B1, wherein the data object corresponds to a page of an application.

B9. The method according to B1, wherein the data object corresponds to a leaderboard of an application.

B10. The method according to B1, further comprising: constantly detecting the number of users accessing the data object; constantly determining the TTL based on the update frequency and the constantly detected number of users; and constantly updating the TTL to the cache server.

B11. The method according to B4, wherein the number of users accessing the data object is constantly detected and the TTLmin is constantly determined based on the constantly detected number of users accessing the data object, the TTL is constantly determined to be equal to or less than the TTLmax and equal to or greater than the TTLmin, and the TTL is constantly updated to the cache server.

B12. A system for determining a time to live (TTL) for a data object on a cache server, comprising one or a plurality of processors, wherein the one or plurality of processors execute a machine-readable instruction to perform: detecting an update frequency of the data object; detecting a number of users accessing the data object; and determining the TTL based on the update frequency and the number of users.

B13. The system according to B12, wherein the one or plurality of processors execute the machine-readable instruction to further perform: determining a minimum time to live (TTLmin) based on the number of users accessing the data object, wherein the TTLmin is determined to be longer when the number of users accessing the data object increases, and the TTL is determined to be equal to or greater than the TTLmin.

B14. The system according to B12, wherein the one or plurality of processors execute the machine-readable instruction to further perform: determining a maximum time to live (TTLmax) based on the update frequency of the data object, wherein the TTLmax is determined to be shorter when the update frequency of the data object increases, and the TTL is determined to be equal to or less than the TTLmax.

B15. The system according to B12, wherein the one or plurality of processors execute the machine-readable instruction to further perform: determining a minimum time to live (TTLmin) based on the number of users accessing the data object, wherein the TTLmin is determined to be longer when the number of users accessing the data object increases; and determining a maximum time to live (TTLmax) based on the update frequency of the data object, wherein the TTLmax is determined to be shorter when the update frequency of the data object increases, and the TTL is determined to be equal to or less than the TTLmax and equal to or greater than the TTLmin.

B16. The system according to B15, wherein the TTL is determined to be TTLmin if the TTLmax is equal to or less than TTLmin.

B17. The system according to B12, wherein the one or plurality of processors execute the machine-readable instruction to further perform: constantly detecting the number of users accessing the data object; constantly determining the TTL based on the update frequency and the constantly detected number of users; and constantly updating the TTL to the cache server.

B18. The system according to B15, wherein the number of users accessing the data object is constantly detected and the TTLmin is constantly determined based on the constantly detected number of users accessing the data object, the TTL is constantly determined to be equal to or less than the TTLmax and equal to or greater than the TTLmin, and the TTL is constantly updated to the cache server.

B19. A non-transitory computer-readable medium including a program for determining a time to live (TTL) for a data object on a cache server, wherein the program causes one or a plurality of computers to execute: detecting an update frequency of the data object; detecting a number of users accessing the data object; and determining the TTL based on the update frequency and the number of users.

B20. The non-transitory computer-readable medium according to B19, wherein the program causes the one or plurality of computers to further execute: determining a minimum time to live (TTLmin) based on the number of users accessing the data object, wherein the TTLmin is determined to be longer when the number of users accessing the data object increases; and determining a maximum time to live (TTLmax) based on the update frequency of the data object, wherein the TTLmax is determined to be shorter when the update frequency of the data object increases, and the TTL is determined to be equal to or less than the TTLmax and equal to or greater than the TTLmin.

What is claimed is:

1. A method for rendering streaming on a user terminal, comprising:
   rendering a first streaming in a first mode;
   receiving an environment parameter of the user terminal;
   receiving a timing when the user terminal closes the first streaming;
   determining a threshold value of the environment parameter based on the timing when the user terminal closes the first streaming;
   receiving an updated environment parameter of the user terminal; and
   rendering a second streaming in a second mode if the updated environment parameter meets the threshold value; wherein the second mode includes fewer data objects than the first mode or includes a downgraded version of a data object in the first mode for the rendering.

2. The method according to claim 1, wherein the threshold value of the environment parameter is determined by a predetermined offset from a value of the environment parameter at the timing when the user terminal closes the first streaming.

3. The method according to claim 2, wherein the environment parameter is a CPU usage rate of the user terminal or a memory usage rate of the user terminal.

4. The method according to claim 3, wherein the data objects include gifts, special effects, game functions, avatars, or animations, and the second mode includes fewer of the data objects than the first mode for the rendering.

5. The method according to claim 2, wherein the environment parameter is a number of times a freezing or a lag occurs during rendering the first streaming in the first mode within a specified time period before the timing when the user terminal closes the first streaming.

6. The method according to claim 5, wherein the data objects include gifts, special effects, game functions, avatars, or animations, and the second mode includes fewer of the data objects than the first mode for the rendering.

7. The method according to claim 2, wherein the environment parameter is a length of time during which a number of frames per second with which the first streaming is rendered in the first mode is below a predetermined value.

8. The method according to claim 7, wherein the data objects include gifts, special effects, game functions, avatars, or animations, and the second mode includes fewer of the data objects than the first mode for the rendering.

9. The method according to claim 2, wherein the environment parameter is a network quality parameter determined by quality factors including an API response time, a TCP connection time, a DNS lookup time, an SSL Handshake time, or a Downstream bandwidth.

10. The method according to claim 9, wherein the data objects include video data from another user, and the second mode includes a downgraded version of the video data from the another user for the rendering.

11. The method according to claim 9, wherein a score for each quality factor is defined according to a performance grade of the quality factor, and a value of the network quality parameter is determined to be an average of the scores of the quality factors.

12. The method according to claim 1, wherein the data objects include a gift, a special effect, a game function, an avatar, an animation, or a video data from another user.

13. The method according to claim 1, wherein the determining the threshold value of the environment parameter comprises:
defining a safe zone for the environment parameter;
determining if the environment parameter is within the safe zone at the timing when the user terminal closes the first streaming;
keeping the threshold value unchanged if the environment parameter is within the safe zone at the timing when the user terminal closes the first streaming; and
tightening the threshold value if the environment parameter is outside of the safe zone at the timing when the user terminal closes the first streaming.

14. The method according to claim 1, further comprising:
receiving a plurality of environment parameters of the user terminal in a study time period;
receiving a plurality of timings when the user terminal closes the first streaming in the study time period;
calculating a correlation between the user terminal closing the first streaming and each said environment parameter; and
determining the threshold value of the environment parameter with the highest correlation regarding the user terminal closing the first streaming before determining threshold values of the rest of said environment parameters.

15. A system for rendering a-streaming on a user terminal, comprising one or a plurality of processors, wherein the one or plurality of processors execute a machine-readable instruction to perform:
rendering a first streaming in a first mode;
receiving an environment parameter of the user terminal;
receiving a timing when the user terminal closes the first streaming;
determining a threshold value of the environment parameter based on the timing when the user terminal closes the first streaming;
receiving an updated environment parameter of the user terminal; and
rendering a second streaming in a second mode if the updated environment parameter meets the threshold value; wherein
the second mode includes fewer data objects than the first mode or includes a downgraded version of a data object in the first mode for the rendering.

16. The system according to claim 15, wherein the threshold value of the environment parameter is determined by a predetermined offset from a value of the environment parameter at the timing when the user terminal closes the first streaming.

17. The system according to claim 15, wherein the environment parameter is a CPU usage rate or the user terminal, a memory usage rate of the user terminal, a number of times a freezing or a lag occurs during rendering the first streaming in the first mode within a specified time period before the timing when the user terminal closes the first streaming, a length of time during which a number of frames per second with which the first streaming is rendered in the first mode is below a predetermined value, or a network quality parameter determined by quality factors including an API response time, a TCP connection time, a DNS lookup time, an SSL Handshake time, or a Downstream bandwidth.

18. The system according to claim 15, wherein the data objects include a gift, a special effect, a game function, an avatar, an animation, or a video data from another user.

19. The system according to claim 15, wherein the determining the threshold value of the environment parameter comprises:
defining a safe zone for the environment parameter;
determining if the environment parameter is within the safe zone at the timing when the user terminal closes the first streaming;
keeping the threshold value unchanged if the environment parameter is within the safe zone at the timing when the user terminal closes the first streaming; and
tightening the threshold value if the environment parameter is outside of the safe zone at the timing when the user terminal closes the first streaming.

20. The system according to claim 15, wherein the one or plurality of processors execute the machine-readable instruction to further perform:
receiving a plurality of environment parameters of the user terminal in a study time period;
receiving a plurality of timings when the user terminal closes the first streaming in the study time period;

calculating a correlation between the user terminal closing the first streaming and each said environment parameter; and determining the threshold value of the environment parameter with the highest correlation regarding the user terminal closing the first streaming before determining threshold values of the rest of said environment parameters.

21. A non-transitory computer-readable medium including a program for rendering streaming on a user terminal, wherein the program causes one or a plurality of computers to execute:

rendering a first streaming in a first mode;

receiving an environment parameter of the user terminal;

receiving a timing when the user terminal closes the first streaming;

determining a threshold value of the environment parameter based on the timing when the user terminal closes the first streaming;

receiving an updated environment parameter of the user terminal; and rendering a second streaming in a second mode if the updated environment parameter meets the threshold value; wherein the second mode includes fewer data objects than the first mode or includes a downgraded version of a data object in the first mode for the rendering.

* * * * *